June 17, 1958
C. G. POTH
2,839,286
CHECKER CONSTRUCTION FOR OPEN HEARTH FURNACES
Filed June 23, 1954
6 Sheets-Sheet 1
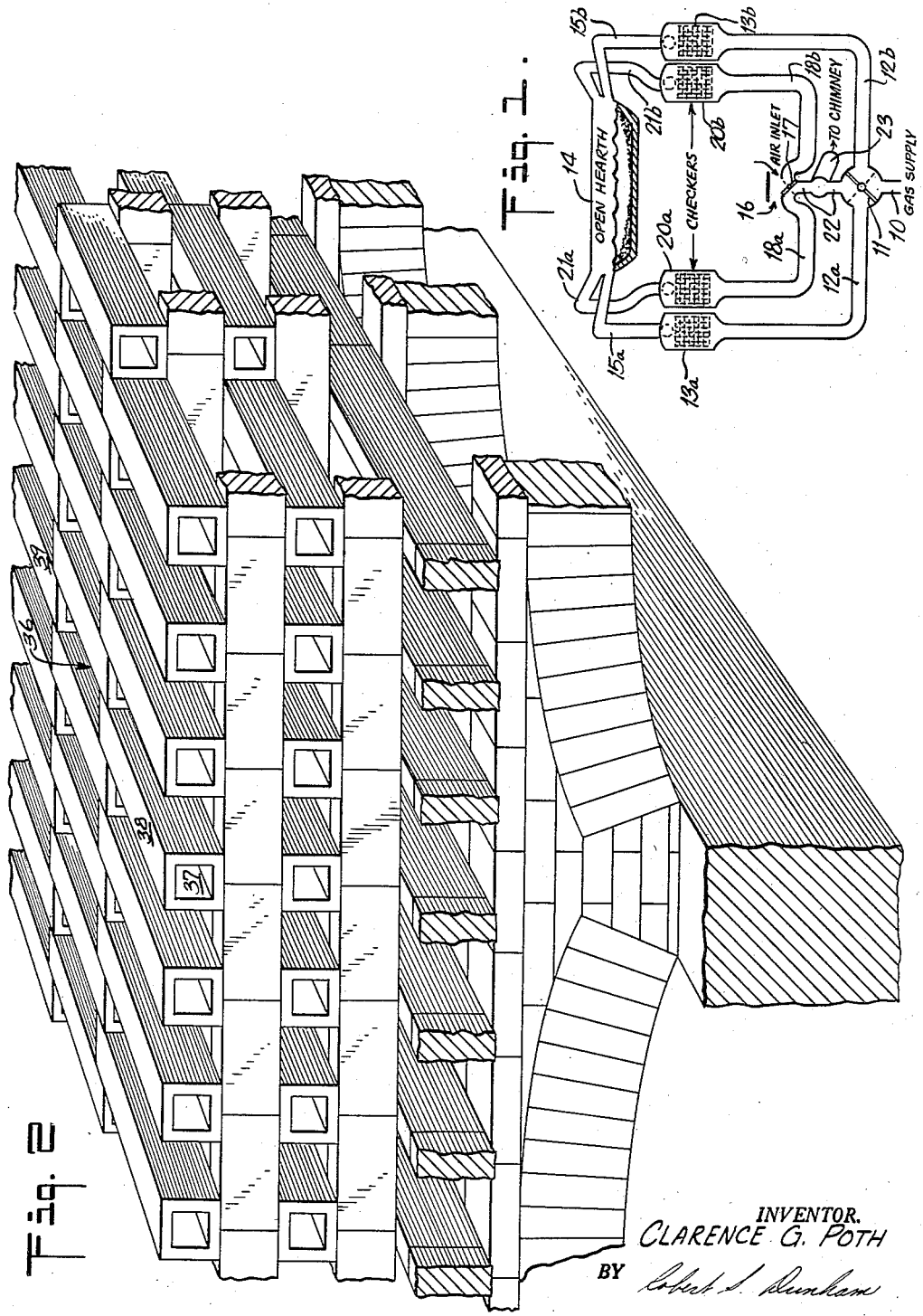
INVENTOR.
CLARENCE G. POTH
BY
ATTORNEY June 17, 1958 C. G. POTH 2,839,286
CHECKER CONSTRUCTION FOR OPEN HEARTH FURNACES
Filed June 23, 1954 6 Sheets-Sheet 2

INVENTOR.
CLARENCE G. POTH
BY
*Robert S. Dunham*
ATTORNEY

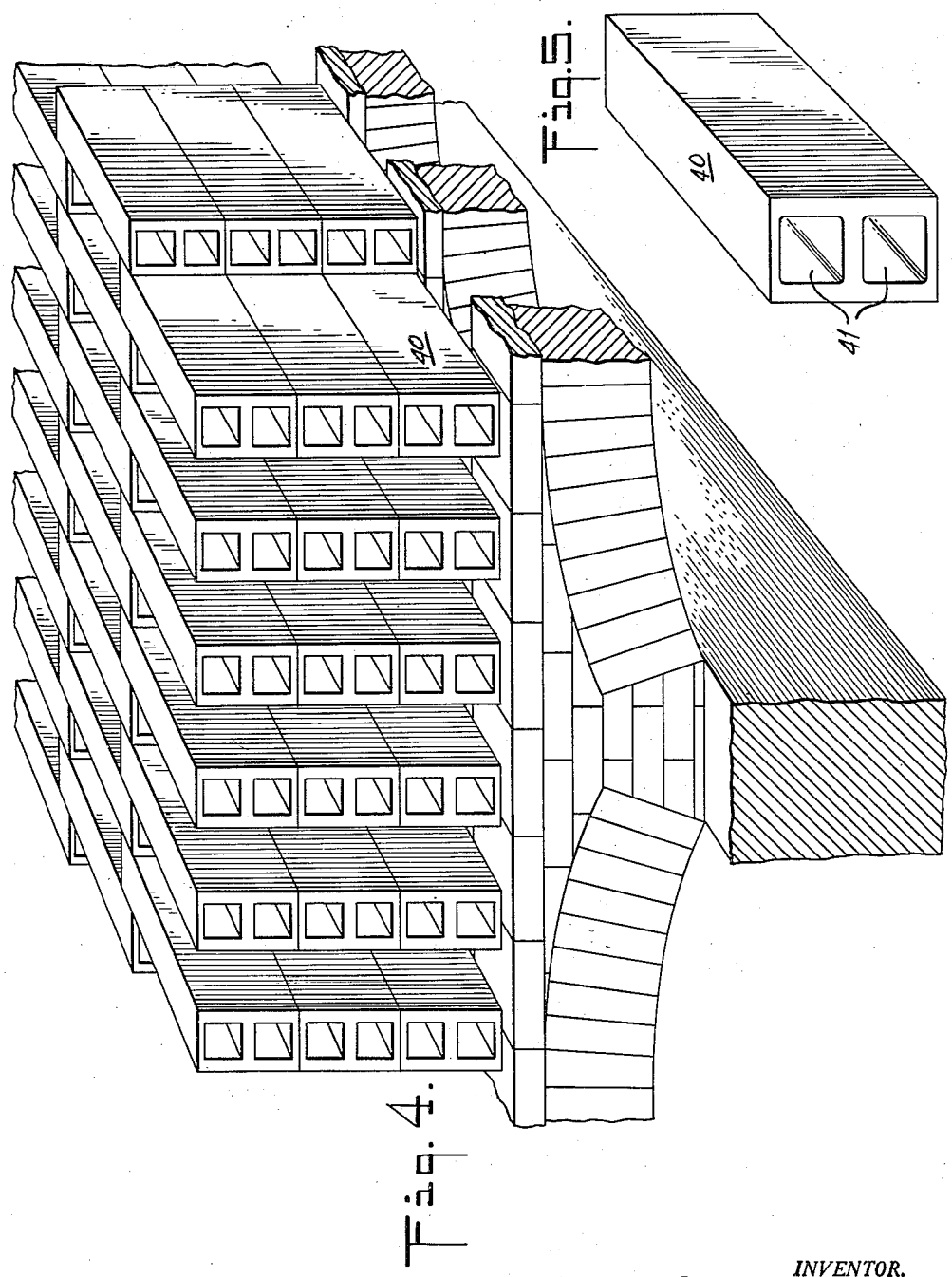

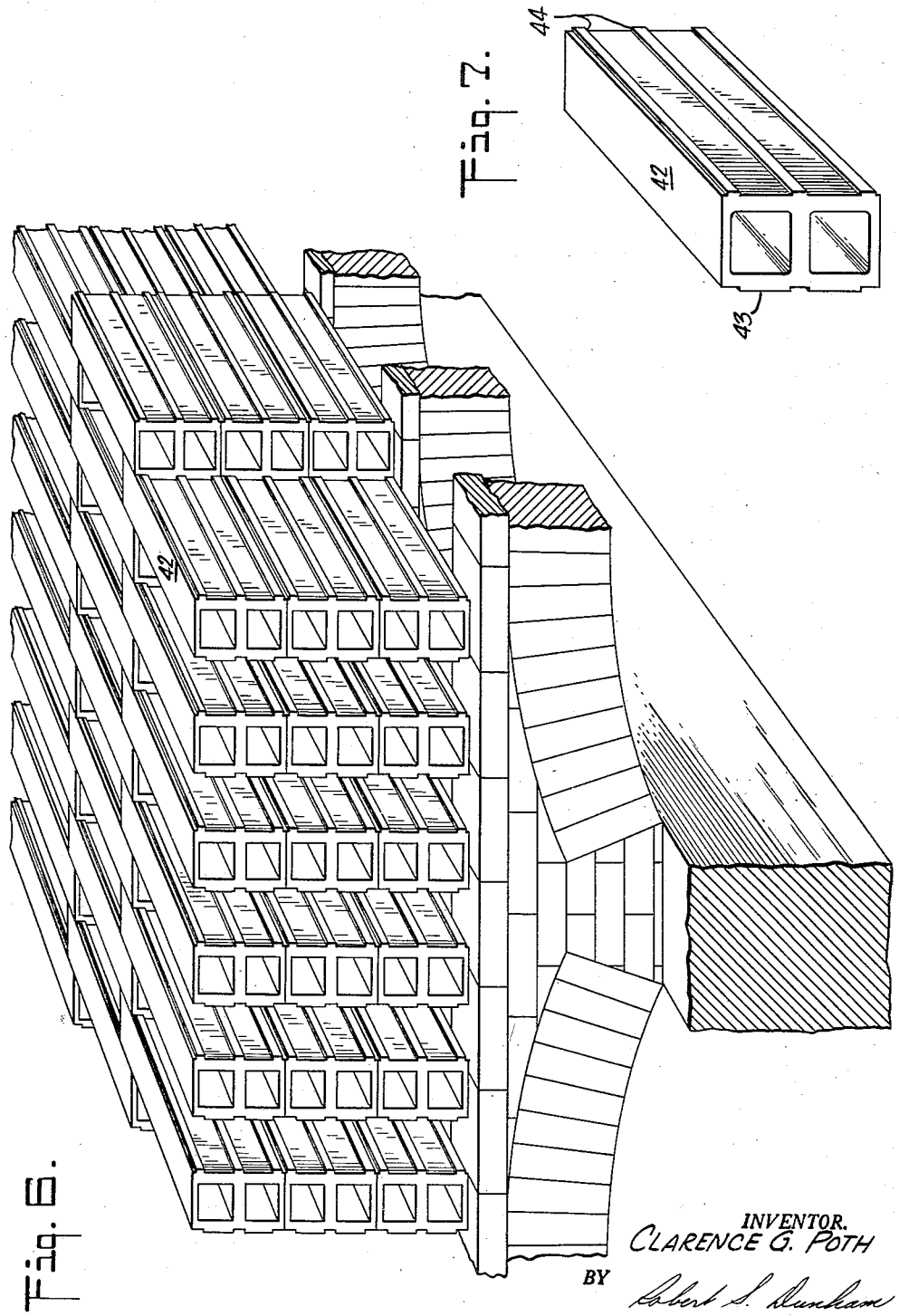

June 17, 1958 C. G. POTH 2,839,286
CHECKER CONSTRUCTION FOR OPEN HEARTH FURNACES
Filed June 23, 1954 6 Sheets-Sheet 5
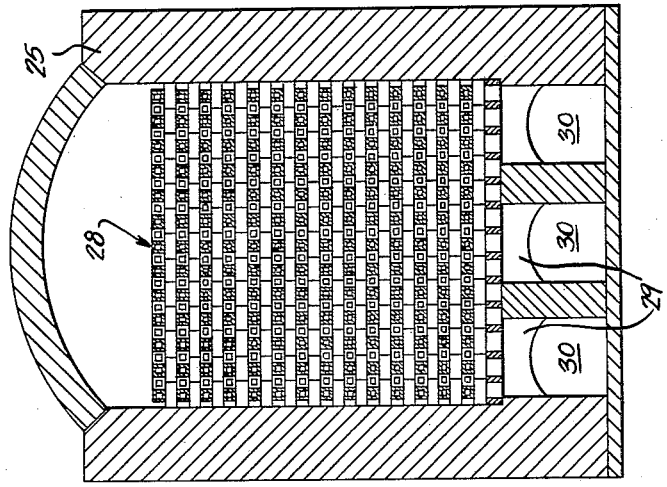
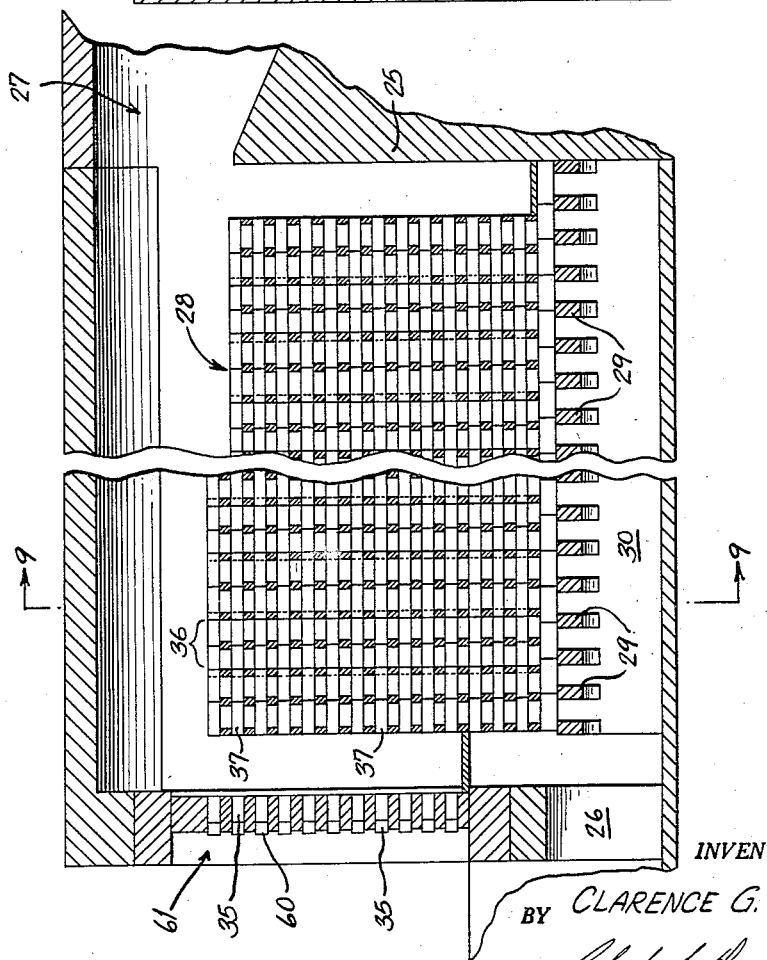
INVENTOR.
BY CLARENCE G. POTH
ATTORNEY

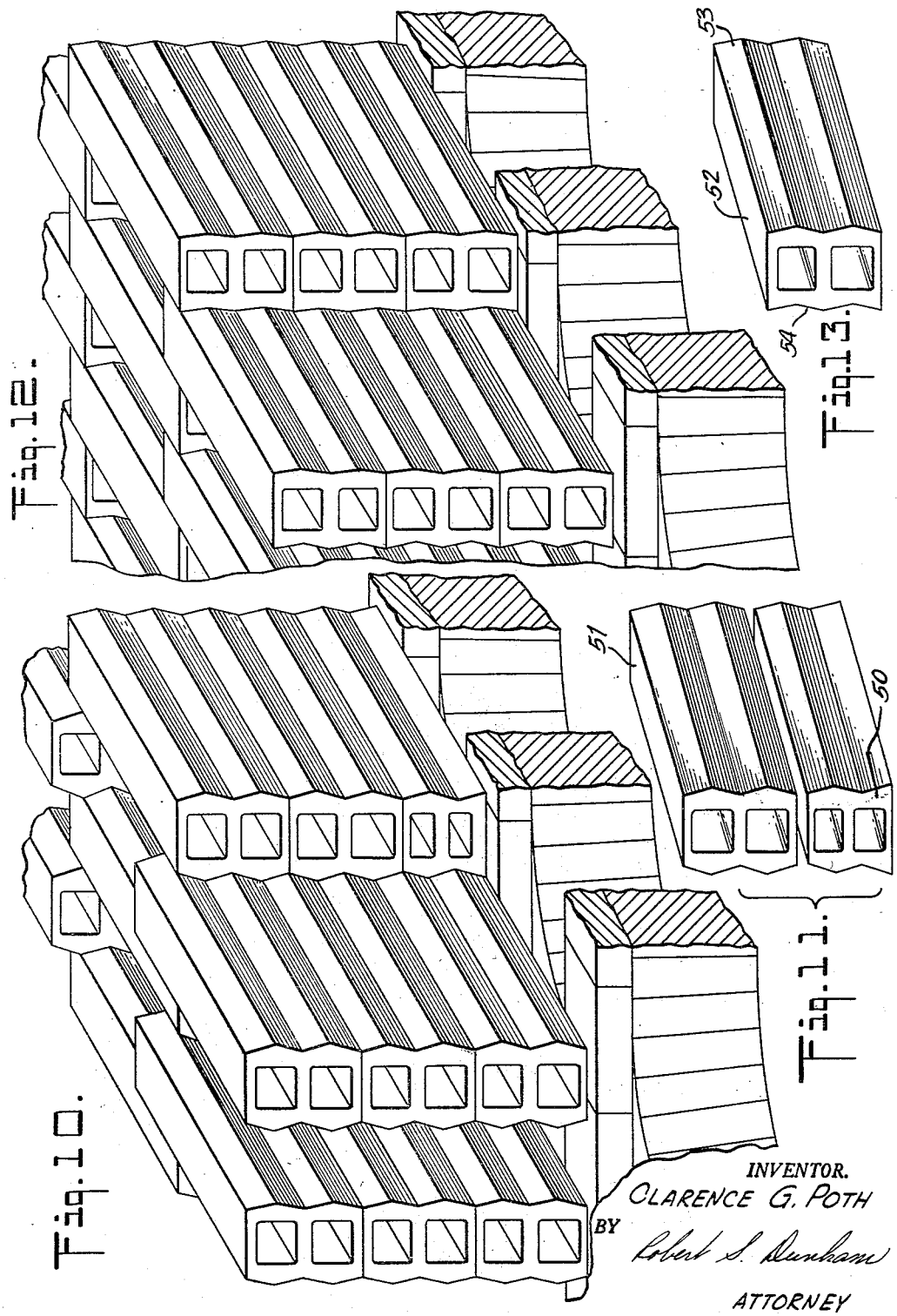

United States Patent Office 2,839,286
Patented June 17, 1958

2,839,286

CHECKER CONSTRUCTION FOR OPEN HEARTH FURNACES

Clarence G. Poth, Massillon, Ohio

Application June 23, 1954, Serial No. 438,647

4 Claims. (Cl. 263—51)

This invention relates to furnaces which require preheated air and employ regenerators for preheating air, and, more particularly, to the construction of the brick elements and their arrangement to constitute regenerators for such furnaces. Glass furnaces, soaking pits and open hearth furnaces are examples of such furnaces.

In open hearth steel furnaces, the waste heat of the products of combustion are used to raise the temperature of the gas and air employed in heating the furnace for the purpose of increasing the temperature in the furnace and also to recover some of the heat in the waste gases and thereby reduce the cost of operation. The furnaces are built with ports at both ends for gas and air. The ports at each end are connected by flues with chambers containing brick work called checkers or regenerators which, in turn, are connected through a system of valves so that the direction of the gas and air through the furnace may be reversed from time to time. When the gas is admitted through the ports on one side of the furnace, the waste gases of the products of combustion are directed out through the ports at the other side of the furnace and pass through the regenerators at that end of the furnace, thereby heating such regenerators. When the valves are reversed, unheated air and gas are passed through the heated regenerator checkers and thereafter pass into the furnace and are burned. During this reverse operation, the regenerator checkers at the other end of the furnace are being reheated by the waste gases which are passing therethrough. The system is reversed in direction about every 15 or 20 minutes so that an opportunity is provided for heating the regenerator checkers periodically and thereby providing sufficient heat in the brick work of the respective checkers to warm the unheated gas and air received therethrough after each reversal of the system.

It has been customary in the regenerative type of open hearth furnace construction to employ solid refractory brick elements in forming the checker construction for the regenerators.

The brick work of the checkers has been formed with the brick elements laid up with openings between adjacent bricks so as to permit the passage of air through the structure. The brick is laid up dry so that it can be readily dismantled for cleaning and replacement.

An important function of the individual bricks has been to absorb heat readily during the first phase of the cycle of operation and thereafter to release it during the second phase of the cycle.

To promote the ready absorption and release of the heat, it had been found desirable to have bricks of relatively thin cross-section. However, at the same time, it was found difficult, when the bricks were reduced in cross-section to have the strength necessary in each brick to carry the load which would be required in the checker construction which involved the laying up of bricks in twenty to thirty courses. Also, because such bricks have been positioned on edge and have been supported only at their ends so as to form sufficient air passages between individual bricks in the checker construction, it has been found that they do not have the necessary physical strength under the circumstances, and have been readily displaced because they offered little support and provided a relatively unstable checker construction. Therefore, although it was known that bricks of relatively thin cross-section were considerably more useful in heat transfer than thicker bricks, it was necessary to use the thicker bricks because of structural considerations.

An important object of this invention is to provide brick elements which can be combined in a checker construction to provide a more stable construction of the regenerators which are not subject to sagging or collapsing because of the narrow supporting surfaces of the individual brick elements during cleaning or because of the physical limitations of the brick elements.

Another object of this invention is to provide a checker construction made up of brick elements which have increased area of brick surface exposed per cubic feet of volume to increase the amount of heat absorption from the outgoing gases.

A still further object of the invention is to provide brick elements which have relatively thin walls which are capable of readily absorbing heat and releasing it by radiation and conduction when the flow of gases is reversed.

A still further object of the invention is to provide a brick element which can be formed into a checker construction which has the above-noted advantages and which may be readily cleaned so that the vertical and cross flues which may have become plugged due to excessive flue dust or slag, may be cleared, so that the gases have ready access to the vertical flues and also may flow horizontally through the construction.

Another object is to provide a sufficient weight and volume of brick work to absorb the heat from the hot waste gases during the first step of the regenerative cycle and readily release the heat, which has been absorbed, to the air in the reverse or second step of the cycle by providing brick elements which have relatively thin walls, such walls providing a maximum of surface area to increase the efficiency of heat transfer. In addition, said elements are so formed as to provide improved stability and strength in the checker structure.

A still further object of the invention is to provide a simple design for checker construction to provide for economy and ease of construction, maintenance and repair.

The invention comprises a checker construction for open hearth furnaces comprised of brick elements, at least some of which are hollow with openings defined at two ends of such elements, the checker construction being laid up in courses to define vertical flues and horizontal passages between adjacent elements, at least some of the horizontal passages being defined by the channels in the hollow bricks, with at least one open end of each hollow tile or brick element accessible from a vertical flue, and with the horizontal channels of the hollow elements being parallel in each course of said elements.

For a more complete description of the invention, reference is made to the drawings wherein:

Fig. 1 is a diagrammatic view of an open hearth furnace and its related checker system;

Fig. 2 is a fragmentary perspective view of one form of checker construction embodying the invention;

Fig. 4 is a fragmentary perspective view of another form of checker construction embodying the invention;

Fig. 5 is a perspective view of one of the tile elements used in the checker construction shown in Fig. 4;

Fig. 6 is a fragmentary perspective view of an additional form of checker construction embodying the invention;

Fig. 7 is a perspective view of one of the tile elements used in the checker construction shown in Fig. 6;

Fig. 8 is a longitudinal sectional view of a checker chamber;

Fig. 9 is a transverse sectional view of the checker chamber, as taken along the line 9—9, in Fig. 8;

Fig. 10 is a fragmentary perspective view of another form of checker construction embodying the invention;

Fig. 11 is a perspective view of two tile elements used in the checker construction shown in Fig. 10;

Fig. 12 is a fragmentary perspective view of a still further form of checker construction embodying the invention; and Fig. 13 is a perspective view of one of the tile elements used in the checker construction shown in Fig. 12.

Figures 2A, 3:
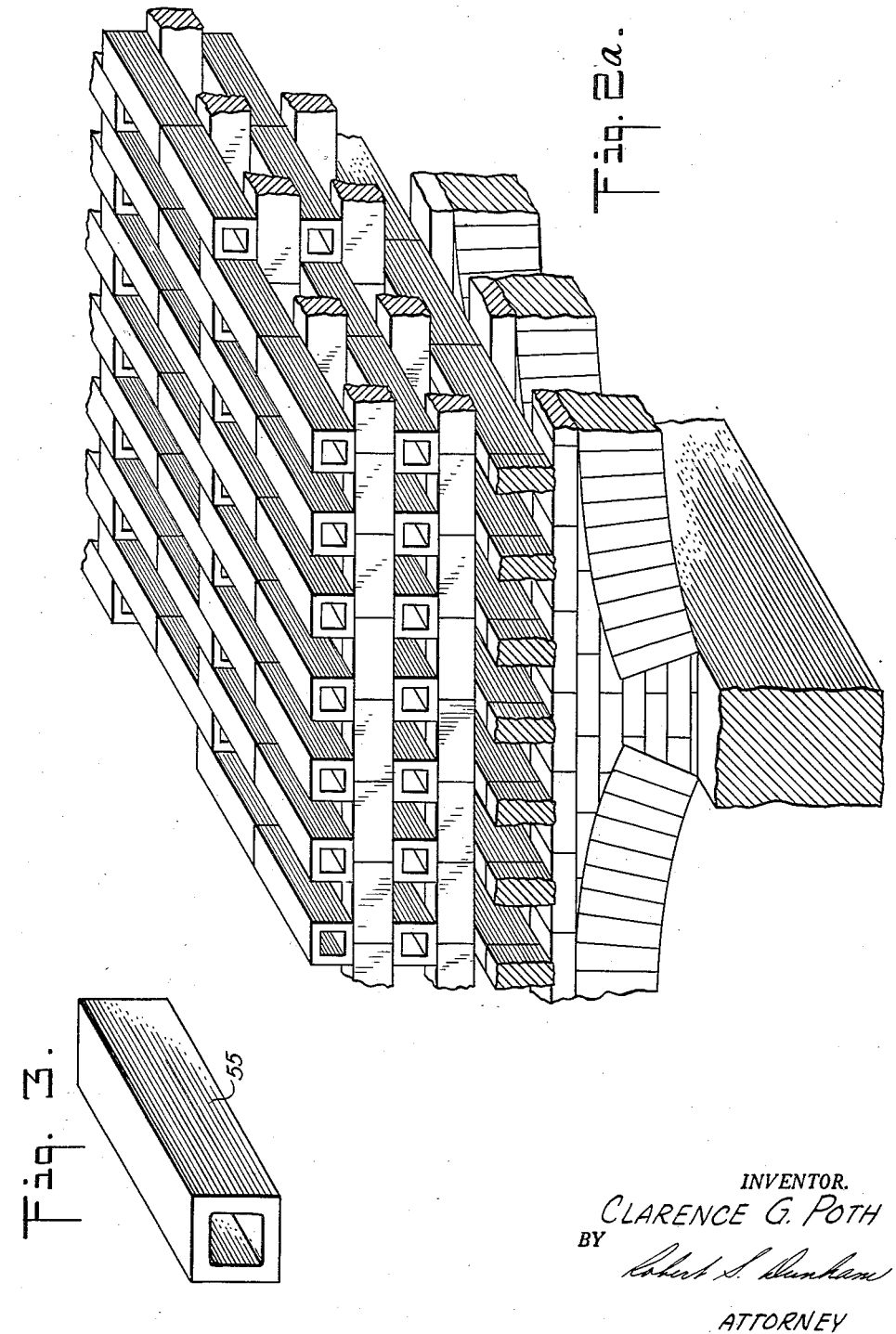
Fig. 2a is a partial perspective view of a variation of the checker construction embodying the invention in which tile elements shown in Figs. 2 and 3 are used.
Fig. 3 is a perspective view of one of the hollow tile elements used in the checker construction shown in Fig. 2.

Referring to Fig. 1, in an open hearth furnace, gas from a supply is fed through pipe 10 and passes to furnace or hearth 14 through reversing valve 11 which directs it, depending on which way the valve is set, either through flue 12a to checker 13a and flue 15a; or, through flue 12b, checker 13b, flue 15b to the hearth 14.

Air, which may be atmospheric, is admitted through air inlet 16, passes to the furnace 14 through reversing valve 17 which directs it, depending on which way the valve is set, to either flue 18a, checker 20a and through flue 21a to the hearth 14 or to flue 18b, checker 20b, through flue 21b to the hearth 14.

When the valves 11 and 17 are set in the full line positions, shown in Fig. 1, the gas moves from the valve 11 through flue 12b, checker 13b, flue 15b to the hearth where combustion takes place with air which moves from the valve 17 through flue 18b, checker 20b, flue 21b to the hearth. From the hearth the waste gases of the combustion move out through the flues 15a and 21a, checkers 13a and 20a, flues 12a and 18a, through valves 11 and 17 to flues 22 to chimney 23.

Figs. 8 and 9 illustrate the structure of the checkers 13a, 13b, 20a and 20b. Each consists of an enclosed vaulted chamber 25 with an opening or port 26 at the lower portion of one end of the chamber and a second opening or port 27 at the upper portion of the other end of the chamber.

Checker brick work 28 is supported on an arched open work foundation 29 leaving a substantially clear air, gas passage 30 below the brick work. The brick work of the checker generally is laid up dry in a plurality of openwork courses, with a clear air, gas passage 31 left open above the upper course.

The checkers are utilized to pre-heat the gas or air before it moves into the hearth where combustion takes place. In order to heat the brick work of a checker, the waste gases are directed through the upper port 27 into the checker chamber 25, and pass down through the brick work 28 and out through the lower port 26. When the direction of flow is reversed, the cool air or gas (depending on which circuit the checker is serving) is admitted through the lower port 26, passes through the heated brick work and moves out through the upper port 27.

It is important during the passage of the hot waste gases through the checker that the brick work absorb as much of the heat as possible and during the reverse operation that the brick work release as much heat to the cool gas or air as possible.

The checker construction of this invention achieves the rapid and efficient heat transfer function by the arrangement of refractory hollow tile elements shown in Figs. 3, 5, 7, 11 and 13 in the formations shown respectively in Figs. 2, 2a, 4, 6, 10 and 12. The arrangements and shapes of the tile elements may be varied from the illustrated forms which are presently preferred embodiments but which are not to be considered as limiting the scope of the invention.

The tile elements may be of any refractory material having suitable qualities of strength and heat absorption and heat transfer. They may be formed with a single channel, as shown in Figs. 2, 2a and 3, or they may be formed with two channels in each element, as shown in Figs. 4 to 7 and 10 to 13.

The tile elements may be longer than the average brick used in checker construction. The average brick for such purposes has the dimensions of 9 inches by 4½ inches by 2½ inches, whereas it has been found that a tile element of the shape shown in Fig. 3, having the dimensions of 12 to 15 inches by 4½ inches by 4½ inches, has been found to be highly successful in actual use. The inner channel may be about 3 by 3 inches, thereby providing a checker element which has walls which may be from ¾ inch to 1 inch thick, and yet at the same time, the tile elements provide for stable construction by having a wider supporting surface, i. e., 4½ inches, as compared to 2½ inches of the standard type brick element. The wider supporting surface of the hollow tile elements results in a stable construction which is not subject to sagging or collapsing. Furthermore, it is a construction in which the elements may not be readily displaced.

It will be appreciated that the solid bricks when placed on their narrow edge, i. e., their usual position in a checker construction, the supporting or bearing surface of the brick is only 2½ inches wide as compared with the 4½ inch wide supporting surface of the hollow tile elements. The solid bricks provide a less stable checker construction element, and, at the same time, the walls of the bricks are 2½ inches thick as compared to the ¾ inch to 1 inch thickness of the walls of the hollow tile. It has been found that the solid brick elements having a 2½ inch wall thickness are less efficient in absorbing and releasing heat during the successive operations of the checker.

In actual tests made during production runs wherein comparisons were made between conventional checker constructions and checkers embodying this invention, it was found that the use of the checker construction of this invention, resulted in savings in fuel consumption of between 18 and 22 percent per ton of steel processed, while, at the same time, the production of tons of steel per hour were increased from 13 to 15 percent and the time between charging and tapping was reduced by 10 percent. These results clearly indicate the very substantial increase in efficiency which is possible with checker constructions of the type embodying this invention, over conventional checker constructions with solid brick elements.

It has been found that by arranging the hollow tile elements in parallel alignment, but with the ends of the tiles spaced apart to provide vertical channels between the ends of the tiles, a checker construction results, in which vertical flues are defined in which at least two walls of such vertical flues have horizontal openings through which the air or gas may circulate in passing through the checker construction thereby providing a maximum of heat exchange in the passage through the checker or regenerator.

In the arrangements shown in Figs. 2 and 2a, the checker constructions include parallel courses of hollow tile laid alternately with transverse courses of solid brick. Such arrangements utilize in part the advantages of the hollow tile elements and provide for horizontal passages in two directions through the checker constructions, the air or gas being free to pass horizontally through the channels 37 in the tile elements in one direction and between courses of the tile elements in a cross flow, generally at right angles to the first direction.

If a construction such as shown in Figs. 2 and 2a were laid up with solid brick elements, it would be impossible to clean the vertical channels by passing cleaning tools horizontally through the brick construction. This can be understood by visualizing the channels in the tile elements as solid; whereas, with the use of hollow tile elements, it has been found practical to pass cleaning tools through the channels of the tiles from one end of the checker chamber through the entire checker construction. For example, long cleaning brushes may be inserted through openings 35 provided in bulkhead 61 at the end of the chamber 25 shown in Fig. 8. The bulkhead 61 may be formed of hollow tile elements similar to those used in the checker construction with the openings 35 of the tiles in the bulkhead aligned with the openings 37 in the tiles of the checker construction. It will be noted that access may be had to cleaning a vertical channel in the interior of the checker, such as 36, by passing a brush or other cleaning tool through opening 37 of tile 38 and that said cleaning may be carried through to a still further vertical passage by passing through the channel in tile 39, the channel of such tile 39 being axially in alignment with channel 37, see Figs. 2 and 8.

In Fig. 2, the tile elements in the alternate courses are laid singly in alternate files in each rank, whereas in Fig. 2a the alternate courses of tile elements are laid in tandem pairs in alternate files.

The alternate courses of transverse solid brick elements of Figs. 2 and 2a may be dispensed with, as shown in Fig. 4 in which the checker construction consists entirely of tile elements 40 having dual channels 41. By combining the tile elements into dual channel members, there are less tile elements and fewer joints, and fewer elements to displace. It will be noted in the construction of Figs. 4 and 6, that the cleaning operation may be carried out from the end of the checker chamber in the same fashion as described in connection with Figs. 2 and 2a with the added advantage that the brush or other cleaning tool may be run through the checker construction at every level of such construction, rather than only at alternate levels as in the case of Figs. 2 and 2a.

When setting the tiles for the checker constructions of Figs. 2 and 2a with courses of transverse brick elements or when the tile elements are set atop one another as in Figs. 4, 6, 10 and 12, the ends of the tile elements may be overlapped as shown. The overlapping ends of the tile may be locked in place with spacer brick to improve stability if desired.

The tile element 42 shown in Fig. 7 is provided with interfitting projections and recesses 43 and 44 to give added stability to the checker construction when the elements are laid up as shown in Fig. 6, so that the projections 43 on one tile element interfit with the recesses 44 on their opposite members.

Referring to Figs. 10 and 11, the tile elements include elements 50 and 51, each of which has two channels and have angularly shaped sides which are adapted to interfit one with another. The elements 50 are used in the lowest course of alternate files of tile elements in the construction, as shown in Fig. 10, so that as the courses are built up, the alternate files are at different levels so that the angular sides of the elements fit properly one with another and greater stability is provided to the entire structure.

Figs. 12 and 13 show a still further form of checker construction, formed of tile elements 52 which have interfitting angularly disposed faces 53 and 54.

The provision of the interfitting lateral faces of the tile elements, as shown in Figs. 6, 7, 10, 11, 12 and 13, assist in giving stability to the checker construction.

It will be understood that if it is desired to have the alternate files of the checker construction formed of the elements 40 of Fig. 5, at different levels as in the construction shown in Fig. 10, such construction can be achieved by placing a single channel tile element such as 55, shown in Fig. 3, in the lowest course of the alternate files.

All the foregoing constructions and shapes of tile elements illustrate presently preferred embodiments of the invention, all include the broad features of the invention, that is, checker construction elements which are hollow, having central channels and which may be arranged so that the channels open on the vertical flues throughout the checker construction to obtain the maximum heat transfer area for absorbing and releasing heat during the successive steps of the checker cycle.

It will be noted that the double flue tiles shown in Figs. 5, 7, 11 and 13 each have a top and bottom thickness of only about one-half the thickness of the center web of the same tile. With this configuration, all the webs have the same thickness when the tiles are placed in a setting and the heat transfer is uniformly efficient.

Essentially the tile elements are laid up in courses to define vertical and horizontal passages between adjacent elements with at least one open end of each element facing a vertical channel. The tile elements are arranged with the open ends of the tiles spaced apart to define vertical flues. With the settings of the tiles with one or both of the open ends exposed to the vertical flues, a desired turbulence is created. The turbulence promotes the thorough transfer of heat from the hot waste gases to the tiles in first phase of the regeneration and a thorough transfer of heat from the checker setting to the fresh gases in the reverse or second phase of the regeneration cycle.

In the constructions shown, the tiles have been arranged in courses with the tiles in each course disposed in parallel ranks and parallel files. The tiles in each rank are spaced about a tile width apart and the tiles in each file are spaced about a tile length apart. The channels of the tiles in the same level and file are coaxial, as described above in connection with the tiles 38 and 39 in Fig. 2, and the orientation of the axes of said channels may be such as to permit the introduction of a cleaning tool from one end of the checker chamber, as through the aligned openings 35 at the end of the chamber 25. In operation, the openings 35 may be closed by plugs so that the gases passing through the chamber do not escape through said openings. The setting of the checker is such that the required cleaning of accumulated flue dust from the operation of the furnace may be expeditiously and effectively accomplished by presently used methods and practices while the furnace is in operation.

It will be understood that the elements may be disposed in other arrangements within the scope of the invention. However, it is not intended that both of the open ends of each tile abut the open ends of the other tiles in the same file to form continuous internal passages as in the recuperative type of heat exchangers. Rather, it is intended by this invention that access be had to both the exterior and interior walls of each tile element for heat transfer during the heat absorbing and the heat releasing steps of the regenerating cycle of the checkers.

It will be noted from the foregoing description of the invention of this application that by providing checker construction elements which have relatively thin walls, but at the same time, provide wider supporting surfaces than the solid brick elements, a checker construction of more stable characteristics results. Furthermore, it will be appreciated that with the use of hollow tile elements, there will be an increased area of heat transfer surface exposed per cubic foot of volume and that as a result of this added heat transfer surface, the amount of heat absorption and heat transfer is increased. It has also been found that with checker construction elements of the hollow tile type, i. e., having one or more flues or cores and having relatively thin walls, such elements are capable of readily absorbing heat and thereafter releasing it by radiation and conduction when the flow of gases is reversed. The tile elements with thin walls can have any desired cross-section and can be of any desired outside contour to fit a desired setting. The design of the checker setting is one of the factors controlling the size and shape of the tiles.

It will be appreciated that the object of providing a checker construction which has vertical and cross flues is achieved. Also, it is to be noted that the checker construction of this invention is of particular advantage in that it may be readily cleaned, without dismantling the checker, and the vertical and cross flues may be cleared of flue dust or slag which may accumulate in the flues. It has been found that the checker construction in this invention has resulted in economy and ease of construction, and has resulted in savings in operation and in the reduction of the costs of maintenance and repair.

Therefore, it will be appreciated that the use of the hollow tile elements, as described in the foregoing arrangements of checker construction and the formation of such checkers in the arrangements described, has resulted in achievement of the objects set forth hereinabove.

In accordance with the provisions of the patent satutes, I have herein described the principle of operation of the invention, together with the elements which I now consider the best embodiments thereof, but I desire to have it understood that the structures disclosed are only illustrative and the invention can be carried out by other means. Also, while it is designed to use the various features and elements in the combinations and relations described, some of these may be altered and modified without interfering with the more general results outlined.

Having thus described my invention, I claim:

1. A checker construction for open hearth furnaces, comprising oblong rectangular hollow tile elements having at least one central channel defined in each element, said channels extending the length of said tile elements and through two ends thereof, the tile elements being laid up in successive courses with the tiles in each course disposed in parallel ranks and parallel files, the tile elements in each rank being spaced apart about the width of one of said tile elements and at least one end of the tiles in each file being spaced about one to two tile lengths apart, the channels of the tiles in the same level and file being coaxial.

2. The checker construction of claim 1, wherein the axes of the channels in all the tile elements are parallel to the files, whereby access may be had to the coaxial channels in all the elements of a file at each level through the outer ends of the tiles in the outside ranks of the checker construction.

3. The checker construction of claim 1, wherein the tiles have flat upper and lower outside surfaces between said ends and having angularly shaped outer side walls adapted to interfit with the outer side walls of similar tile elements.

4. The checker construction of claim 1, wherein tile elements in the lower course of adjacent files are of different heights.

References Cited in the file of this patent

UNITED STATES PATENTS

| | | |
|---|---|---|
| 891,991 | Hermansen | June 30, 1908 |
| 1,687,236 | Buffington | Oct. 9, 1928 |
| 1,745,131 | Odell | Jan. 28, 1930 |
| 1,753,467 | Kniepert | Apr. 8, 1930 |
| 1,902,348 | Wagstaff | Mar. 21, 1933 |
| 1,976,575 | MacDonald | Oct. 9, 1934 |

FOREIGN PATENTS

| | | |
|---|---|---|
| 509,961 | Great Britain | July 25, 1939 |